(12) United States Patent
Oittinen et al.

(10) Patent No.: US 11,453,551 B1
(45) Date of Patent: Sep. 27, 2022

(54) STACKED DISK ITEM STORAGE AND RETRIEVAL SYSTEM WITH OPTIMIZED ITEM POSITIONING AND ITEM DATA CONTROL

(71) Applicant: Capps Oy, Kotka (FI)

(72) Inventors: Teemu Oittinen, Kotka (FI); Ilpo Hakkarainen, Kotka (FI)

(73) Assignee: Capps Oy, Kotka (FI)

( * ) Notice: Subject to any disclaimer, the term of this patent is extended or adjusted under 35 U.S.C. 154(b) by 956 days.

(21) Appl. No.: 16/221,461

(22) Filed: Dec. 15, 2018

(51) Int. Cl.
| | |
|---|---|
| *B65G 1/04* | (2006.01) |
| *B65G 1/06* | (2006.01) |
| *B65G 1/137* | (2006.01) |
| *G07F 11/50* | (2006.01) |
| *G06K 7/10* | (2006.01) |
| *G07F 11/54* | (2006.01) |
| *G05B 19/416* | (2006.01) |

(52) U.S. Cl.
CPC .............. *B65G 1/045* (2013.01); *B65G 1/06* (2013.01); *B65G 1/1371* (2013.01); *G06K 7/10475* (2013.01); *G07F 11/50* (2013.01); *G07F 11/54* (2013.01); *B65G 2203/046* (2013.01); *G05B 19/416* (2013.01); *G05B 2219/31037* (2013.01)

(58) Field of Classification Search
CPC ......... G07F 11/54; G07F 11/50; B65G 1/045; B65G 1/06
See application file for complete search history.

(56) References Cited

U.S. PATENT DOCUMENTS

| | | | | |
|---|---|---|---|---|
| 4,067,607 | A * | 1/1978 | Battles | A01K 97/22 D3/905 |
| 4,815,580 | A * | 3/1989 | Schanz | B65G 47/5136 198/453 |
| 6,016,927 | A * | 1/2000 | Krupp | B65G 1/045 211/126.2 |
| 6,626,305 | B2 * | 9/2003 | Domenig | A47B 57/26 211/144 |
| 7,398,889 | B1 * | 7/2008 | McNulty | A47B 73/00 211/74 |
| 10,246,257 | B1 * | 4/2019 | Battles | B65G 1/1373 |
| 2003/0127463 | A1 * | 7/2003 | Varis | G07F 11/62 221/13 |
| 2006/0169187 | A1 * | 8/2006 | Hoffman | A47B 49/006 108/103 |
| 2013/0238115 | A1 * | 9/2013 | Smith | G07F 9/001 700/214 |
| 2015/0203297 | A1 * | 7/2015 | Manning | B65G 1/133 700/218 |
| 2017/0158438 | A1 * | 6/2017 | Berdelle-Hilge | B65G 57/00 |
| 2019/0142176 | A1 * | 5/2019 | Schneidewent | A47B 49/004 5/503.1 |
| 2019/0392667 | A1 * | 12/2019 | Naaman | G07F 17/0042 |
| 2021/0237972 | A1 * | 8/2021 | Li | F16M 13/02 |

* cited by examiner

*Primary Examiner* — Thomas Randazzo
(74) *Attorney, Agent, or Firm* — Christopher Pilling

(57) ABSTRACT

This disclosure includes an item storage and retrieval device comprising one or more stacked circular disks, each disk having a slot on its radius to the center and rotating on a central column such that, when slots on higher disks are aligned, a target disk may be accessed below for item storage or retrieval; which device may further comprise a disk item access unit for placement, orientation, and retrieval; which device may further comprise one or more RFID readers; and which device may further comprise a system and interface for managing and optimizing item storage to and retrieval from stacked circular disks.

6 Claims, 6 Drawing Sheets

STACKED DISK ITEM STORAGE AND RETRIEVAL SYSTEM WITH OPTIMIZED ITEM POSITIONING AND ITEM DATA CONTROL

FIELD OF DISCLOSURE

The present disclosure relates to the field of item storage and retrieval systems, including a stacked circular disk arrangement and methods of controlling and using such devices.

BACKGROUND OF RELATED ART

Several different automated devices in the general field of item storage and retrieval systems are known. Vending machines and other retrieval systems utilizing separate slots, shelves, or compartments for product items with fixed or carousel displays are known. Such systems are inefficient as to the space required for the device for a given number of items and as to the limitations on the number of items, and different sizes of items, that can be distributed at one time. Such systems are also inefficient in that moving parts take up a large portion of the space, resulting in a large footprint and size of device, and slow speed.

U.S. Pat. No. 8,919,637, European Pat. No. EP1358117B1, and U.S. patent application Ser. No. 15/262,125 all describe shelf, drawer, or slot retrieval systems in the field of terminals for parcel items. Similarly, U.S. Pat. No. 2,617,267 discloses a circular assembly for display and vending of frozen food items, with individual locker storage spaces that are wedge-shaped and stacked on a turntable, in a number of horizontal tiers, providing vertical rows and access to an individual locker space at the edge of each turntable. All such solutions ineffectively use space for a given number of the subject items, are limited as to the number and sizes of items distributed, are limited as to the speed required to store or retrieve each item, and inefficiently utilize the space required.

Several devices in the form of circular disks are also known in the field of electronic data storage and retrieval. For example, U.S. Pat. No. 6,735,678 describes a method and apparatus to defragment data by optimizing the available physical block address on a media into one or more contiguous physical block addresses, and storing fragmented data into the one or more contiguous block addresses. Such prior art embodies methods to access and optimize data space in the electronic realm, not a stacked circular disk device for storage and retrieval of physical items.

SUMMARY

The present innovation is to offer a more effective and faster device with optimized space allocation and positioning, as distinguished from prior art for physical item storage and retrieval. In order to achieve the objective, the present innovation utilizes an item storage and retrieval device comprising one or more stacked circular disks, rotating on a central column, with the target position on the subject disk within the stack accessed through aligned slots on higher disks.

As distinct from prior solutions utilizing item storage on shelves, special pre-set channels, or lockers, the present innovation uses rotating storage disks and stores each item at a computed location upon a disk, using the available surface area of the entire disk. The device identifies and allocates space for the item to be stored, and positions the item to utilize only the space required.

Unlike prior solutions where the stored and retrieved items must be of similar size, shape, or manner of packaging to comport with fixed shelves, slots, or lockers, the positioning and allocation of space on circular stacked disks as set forth in the present disclosure eliminates such restrictions.

BRIEF DESCRIPTION OF DRAWINGS

(FIG. 1).

(FIG. 2).

(FIG. 4).

(FIG. 5a, 5b, 5c).

(FIG. 6).

DETAILED DESCRIPTION

An item storage and retrieval device comprising one or more stacked circular disks each with a slot along its radius according to the present disclosure, may offer a more effective and faster solution for storage and retrieval of physical items compared to known solutions.

The present innovation is to offer a more effective and faster device in a stacked circular disk arrangement, as distinguished from prior art. In order to achieve the objective, the available surface area of each disk is utilized for storage and retrieval to accommodate as many physical items as possible on the smallest area possible.

Figure 1:
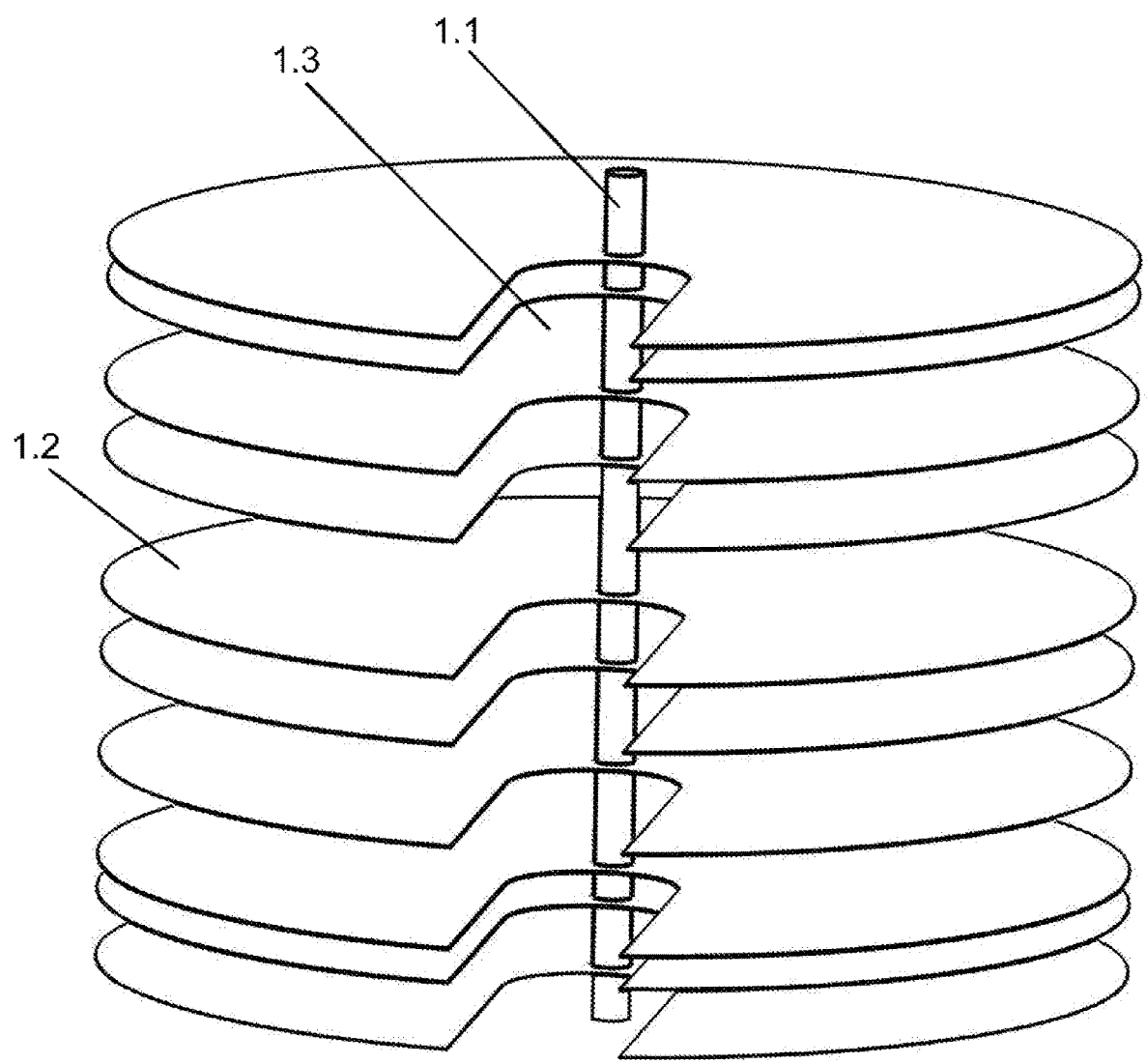
FIG. 1 is a diagrammatic depiction of an embodiment of stacked circular storage disks, each with a disk slot along its radius to the center, subject of the present disclosure, including disks 1.2 with disk slots 1.3 rotating around a center column 1.1.
Figure 2:
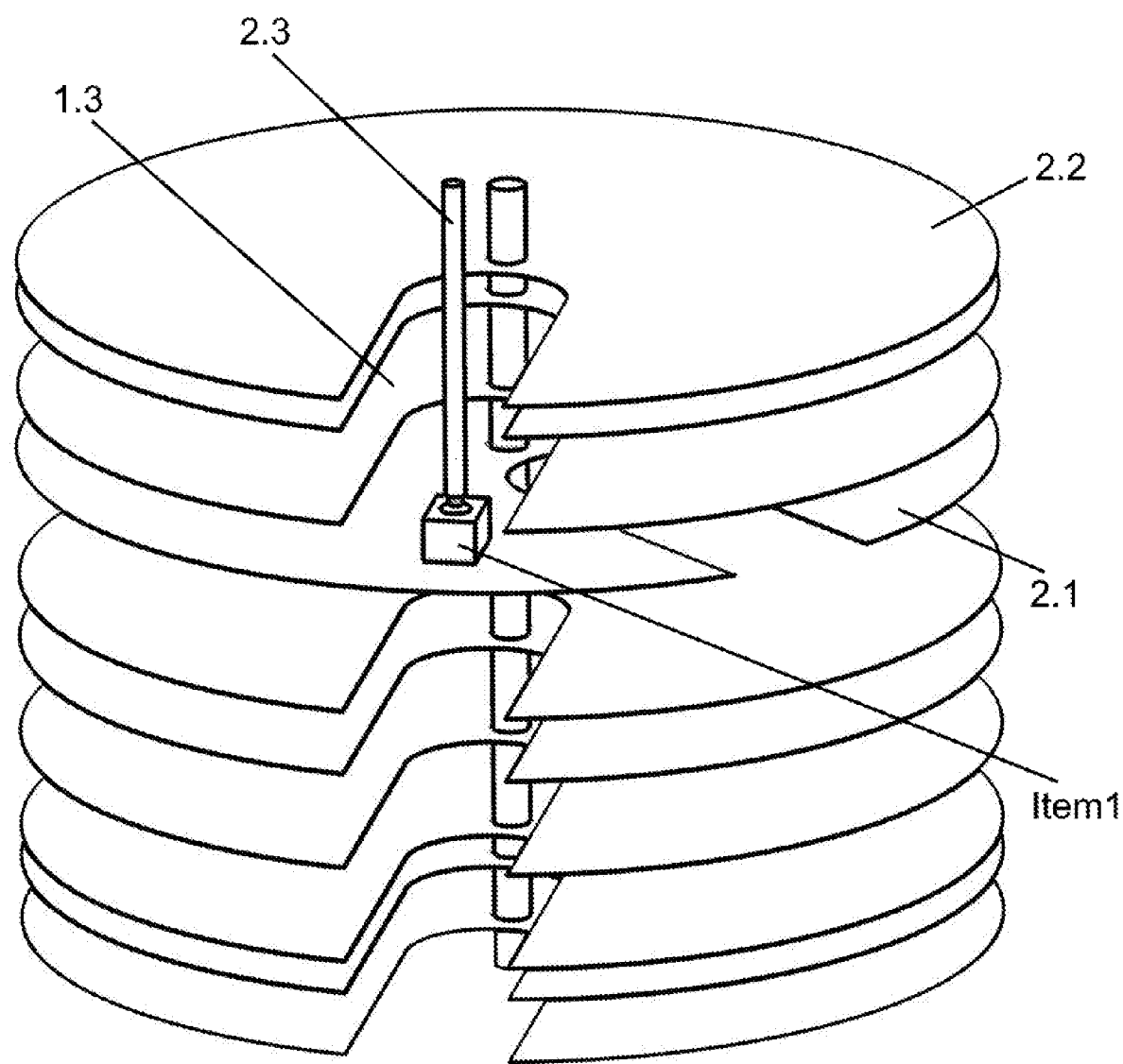
FIG. 2 is a diagrammatic depiction of the alignment of the slots on the higher stacked disks 2.2, allowing access to a target lower disk 2.1 for storage or retrieval of an item. One embodiment of a disk item access unit 2.3 is shown reaching through the aligned slots.

As distinct from prior solutions utilizing item storage on shelves, special pre-set channels, or lockers, the present innovation uses rotating stacked disks and stores each item at a computed location upon a target disk. (FIG. 1). The disks higher in the disk stack are rotated to align the disk slots, providing access to a disk position on the target disk at a lower level of the disk stack. (FIG. 2).

Unlike prior solutions where the stored and retrieved items must be of similar size, shape, or manner of packaging to comport with fixed shelves, slots, or lockers, the dynamic positioning and allocation of space of the present disclosure eliminates such restrictions.

A set of available options as to suitable storage disk with the correct height difference, and an available position on that disk (together the Disk/Position), may be generated based on the measured item dimensions.

The user may select to optimize positioning using item attributes and Disk/Position attributes. For example, the user may choose to track, or assign, an item's pick frequency within item attributes, and within Disk/Position attributes may choose to track, or assign, average retrieval speed, proximity to output, or other benefit of a particular disk or position. In this example, the user may choose to give priority to items with high pick frequency, for placement on Disk/Positions with faster attributes.

In configurations of varying heights of disk gap within the disk stack, item placement may be prioritized to the disk within the stack that has the lowest possible gap to fit the subject item.

In one embodiment, the subject item may be handled inside the unit with a disk item access unit, capable of reaching the target disk and position through the aligned disk access slots on the higher level disks. In the illustrated embodiment (FIG. 2), the disk item access unit (2.3) is shown reaching through the aligned slots (e.g., 1.3).

In one embodiment, the subject item and Disk/Position locations may be tagged to convey radio-frequency identification (RFID) information, which may be read by one or more RFID readers.

The device may also include a system and interface for managing item storage and retrieval on the stacked circular disks. This may include a computer system, including a processor and a memory, to maintain a database of Disk/Position attributes and item attributes and to control one or more item positioning elements.

For example, the system may record that a subject item is stored at certain coordinates on Disk 4 within a ten disk stack, numbered top to bottom. Upon retrieval request, the system would provide an instruction to the device to rotate Disk 1, Disk 2, and Disk 3 if necessary to align the access slots, and to rotate Disk 4 to reveal the subject coordinates below the aligned slots. In embodiments with a disk item access unit, the system would then provide instruction for the disk item access unit to reach through the slot to the target coordinates on Disk 4 and transport the subject item up through the aligned slots and out, to, for example, an output chute.

The system may record the processing of that retrieval and provide item attribute data to an interlinked system with which inventory or other item data may be shared.

The present device differs in many ways from known solutions. The device is compact due to storage with rotating stacked circular disks (FIG. 1), providing higher capacity in a smaller footprint.

In one embodiment, an input system may include a temporary storage disk, acting as a buffer. In such example, the disk item access unit moves the item from the temporary disk to an assigned Disk/Position according to system instructions.

Figure 3:
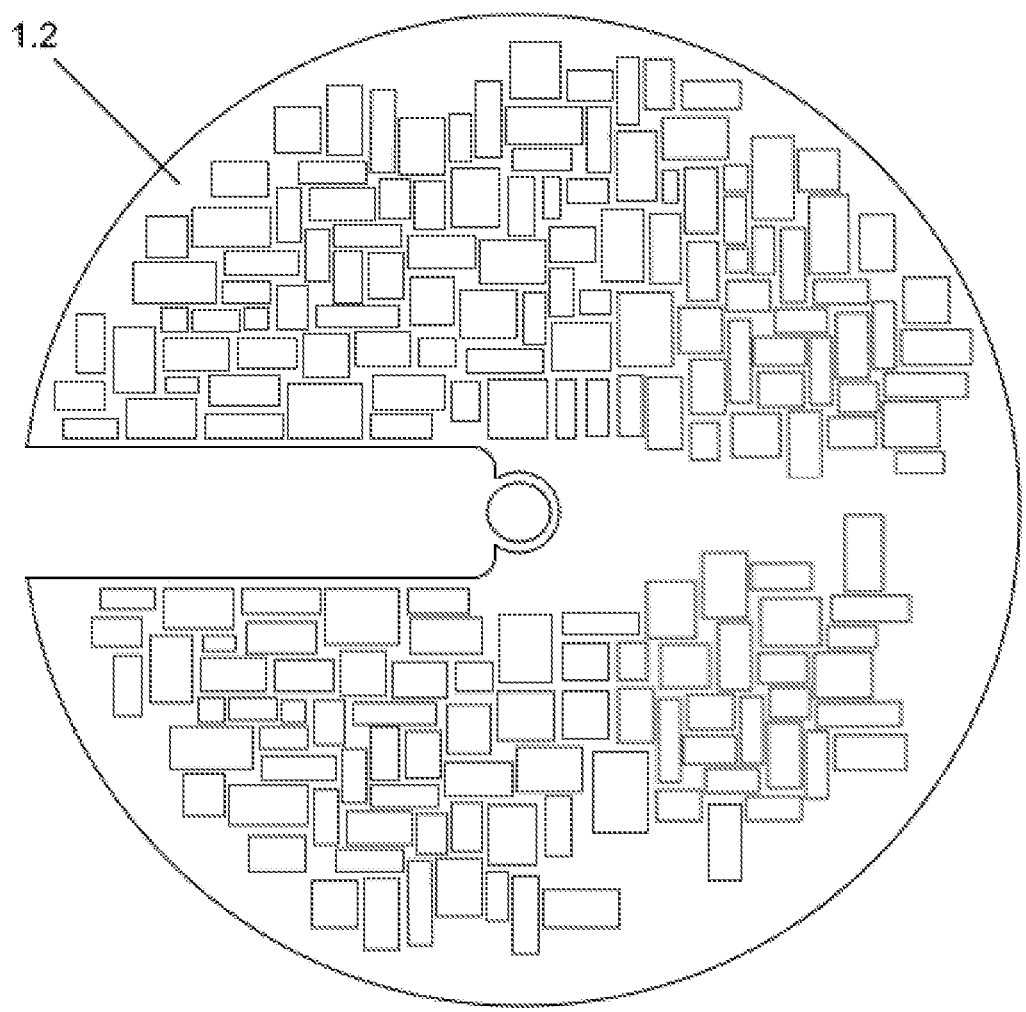
FIG. 3 is a diagrammatic depiction of one embodiment of a disk storage surface with positioned items (FIG. 3).
Figure 4:
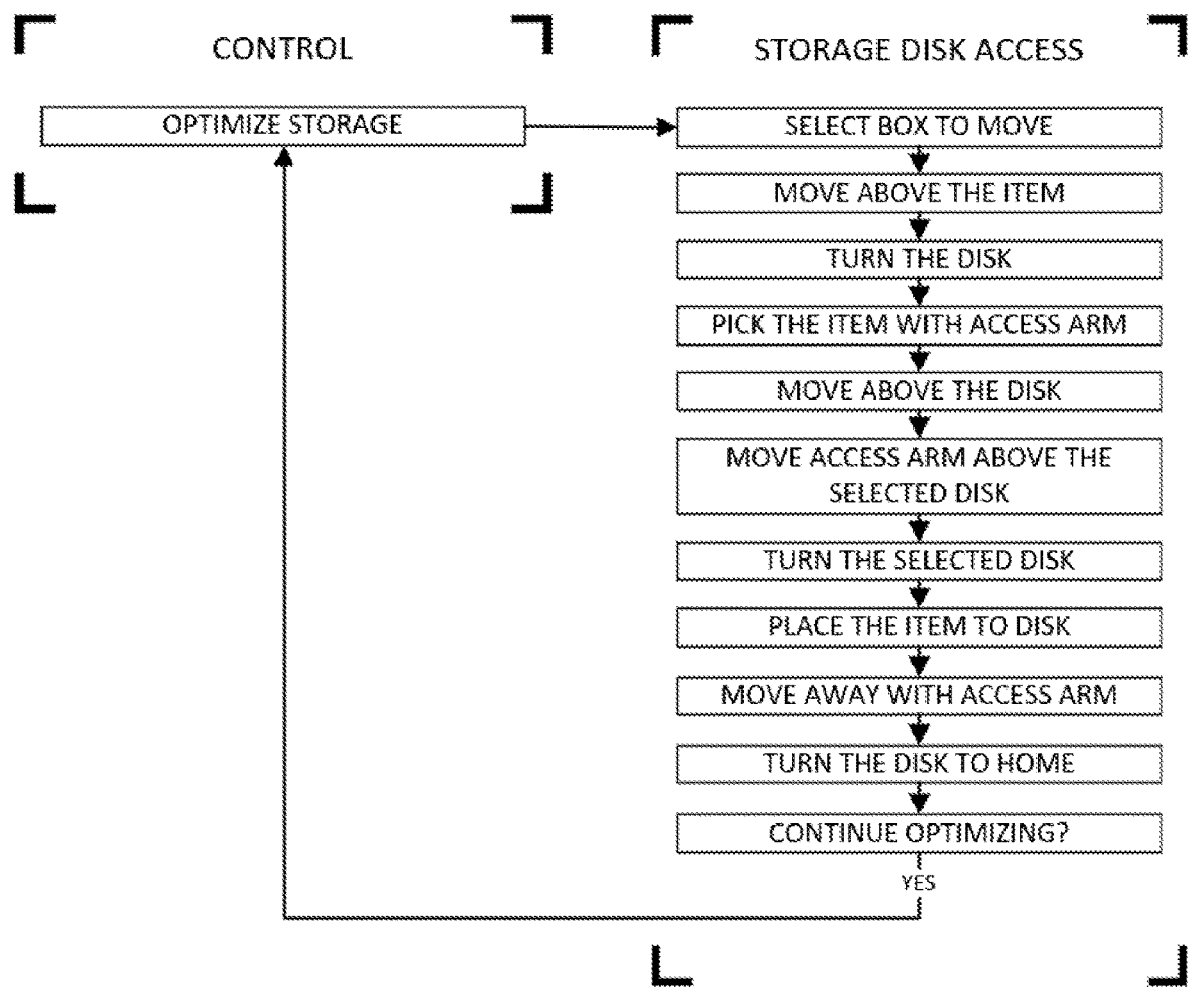
FIG. 4 is an example flowchart of one embodiment of the storage process in accordance with the present disclosure.

In some embodiments, the circular disk stack may be configured with equal spacing, or may be configured with different gap heights. (FIG. 1, FIG. 2). The items are stored inside the device (FIG. 3) according to dimension and by optimizing factors in accordance with the present disclosure. (FIG. 4).

Figure 5A:
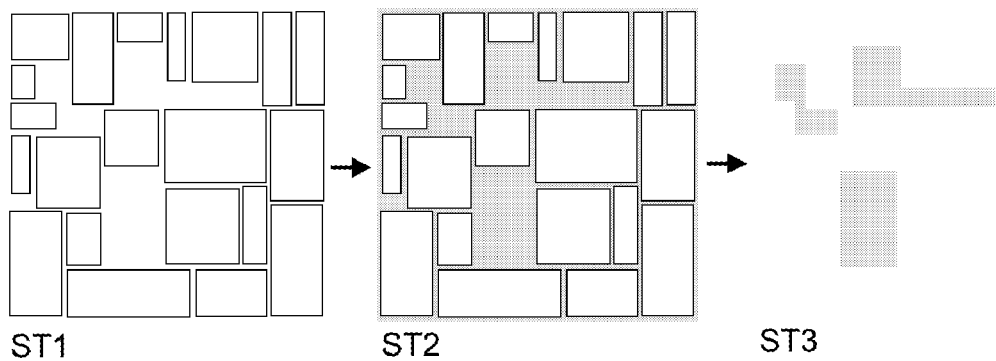
FIGS. 5a, 5b, and 5c are sample illustrations depicting the principle of finding the optimal and least space consuming position on the disk.

For example, the least space-consuming position is analyzed so that the empty space is used the most efficiently. (FIG. 5a). In one embodiment, the system generates a map of item positions (FIG. 5a, ST1) and empty areas on the disk (FIG. 5a, ST2). By removing areas of small gaps and other unused areas, the system may derive empty areas for available item positioning. (FIG. 5a, ST3).

Figure 5B:
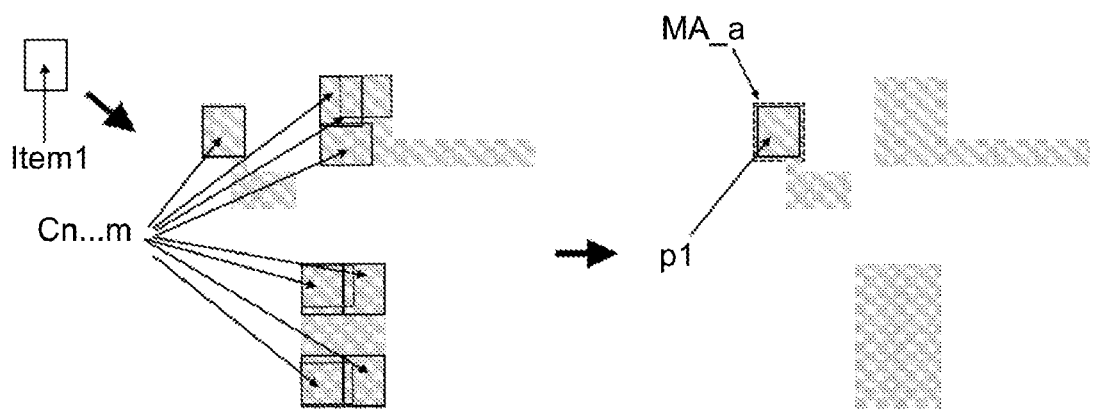
Figure 5C:
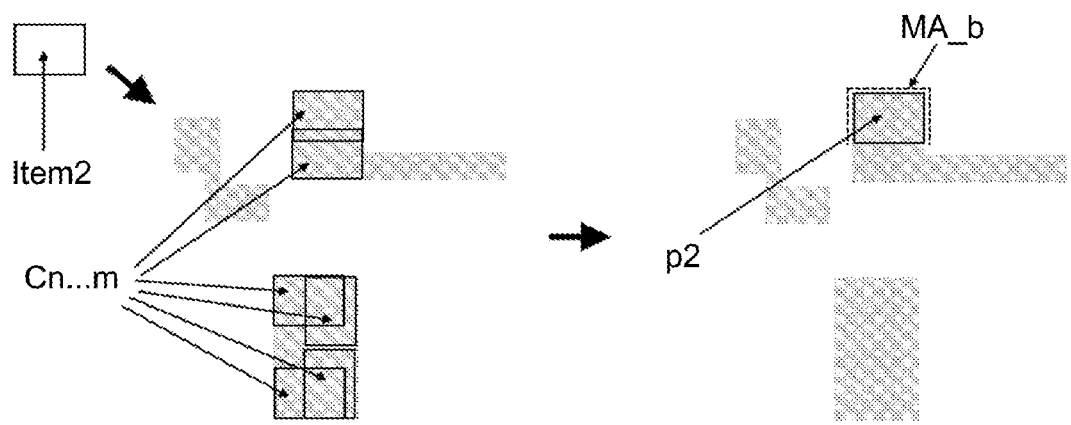

In such example, when in-feeding an item (FIG. 5b, Item1, and FIG. 5c, Item2) the system tries to find a suitable position by computing all possible positions in two orientations. From this it gets candidates (FIG. 5b and FIG. 5c, Cn . . . m), which are scored for number of matching sides (FIG. 5b, MA_a, and FIG. 5c, MA_b), with the highest score provided preference for item placement. The remaining empty area after item placement may also be considered, with the score of candidate positions reduced when unusable empty space would remain.

Figure 6:
FIG. 6 is a sample illustration depicting the principle of placing smaller items adjacent to internal and external curved edges.

In some embodiments, storage space optimization processes may be accomplished during non-peak times, to move the items closer to each other and optimize the space of the storage disk. In some embodiments, smaller items are provided placement preference near the perimeter and at the disk center, as smaller items can fill curved edges more effectively. (FIG. 6).

What is claimed is:

1. An item storage and retrieval device comprising:
one or more stacked circular disks;
each disk configured with a disk slot on its radius extending to a disk center;
each disk rotatable on a central column such that higher stacked disks may be positioned with aligned slots, and an item may be stored on or retrieved from a lower target disk that is reached through the aligned slots; and
a disk item access unit that can move through aligned disk slots for placement, orientation, and retrieval of items on the target disk.

2. The item storage and retrieval device of claim 1, further comprising:
one or more radio-frequency identification (RFID) readers for identification of attributes of the item and of the disk and position.

3. An item storage and retrieval device comprising:
one or more stacked circular disks;
each disk configured with a disk slot on its radius extending to a disk center;
each disk rotatable on a central column such that higher stacked disks may be positioned with aligned slots, and an item may be stored on or retrieved from a lower target disk that is reachable through the aligned slots;
a disk item access unit configured to move through the aligned disk slots for placement, orientation, and retrieval of items on the target disk; and
a temporary storage disk to use as a buffer for an input item before it is assigned to its target disk and position.

4. An item storage and retrieval device comprising:
one or more stacked circular disks;
each disk configured with a disk slot on its radius extending to a disk center;
each disk rotatable on a central column such that higher stacked disks may be positioned with aligned slots, and an item may be stored on or retrieved from a lower target disk that is reachable through the aligned slots;
a disk item access unit configured to move through the aligned disk slots for placement, orientation, and retrieval of items on the target disk; and
a system and interface for managing item storage and retrieval on stacked circular disks, including:
a computing system, including a processor and a memory, with program instructions causing the processor to at least:
maintain a database of the stacked disk and position attributes and item attributes; and
control one or more item positioning elements.

5. The item storage and retrieval device of claim 4, wherein the program instructions cause the processor to determine optimum positioning based upon disk and position attributes of retrieval speed and proximity to output, and with closest fit to the item to minimize empty three dimensional space.

6. The item storage and retrieval device of claim 4, wherein the program instructions cause the processor to determine priority of a disk and position based upon optimizing factors that the program instructions cause the device to learn during a designated period of device use, including:
- the frequency of a subject item retrieval; and
- grouping of items frequently retrieved together for disk and position assignment in proximity for subsequent grouped item retrieval.

* * * * *